(12) United States Patent
Borisov et al.

(10) Patent No.: US 8,336,323 B2
(45) Date of Patent: Dec. 25, 2012

(54) VARIABLE SPEED DRIVE WITH PULSE-WIDTH MODULATED SPEED CONTROL

(75) Inventors: Konstantin Borisov, York, PA (US); Zhiqiao Wu, York, PA (US); Michael S. Todd, Jacobus, PA (US); Justin Drew Warner, Harrisburg, PA (US); Shreesha Adiga Manoor, York, PA (US); Ivan Jadric, York, PA (US); Scott Victor Slothower, Dillsburg, PA (US); Kanishk Dubey, York, PA (US); John C. Hansen, Spring Grove, PA (US)

(73) Assignee: Johnson Controls Technology Company, Holland, MI (US)

( * ) Notice: Subject to any disclaimer, the term of this patent is extended or adjusted under 35 U.S.C. 154(b) by 601 days.

(21) Appl. No.: 12/572,915

(22) Filed: Oct. 2, 2009

(65) Prior Publication Data
US 2010/0083693 A1 Apr. 8, 2010

Related U.S. Application Data

(60) Provisional application No. 61/102,687, filed on Oct. 3, 2008.

(51) Int. Cl.
*F25B 49/00* (2006.01)
(52) U.S. Cl. ............ 62/228.1; 62/228.4; 62/229; 62/230
(58) Field of Classification Search .................. 62/228.1, 62/228.4, 229, 230, 498; 700/276; 318/700, 318/801, 808, 400.17; 310/156.28
See application file for complete search history.

(56) References Cited

U.S. PATENT DOCUMENTS 3,593,103 A 7/1971 Chandler et al.
(Continued)

FOREIGN PATENT DOCUMENTS

EP 0272776 A2 6/1988
(Continued)

OTHER PUBLICATIONS

Silicon Carbide npnp Thyristors, John H. Glenn Research Center, Cleveland, Ohio, downloaded from http://www.nasatech.com/Briefs/Dec00/LEW16750.html on Jan. 20, 2004, 3 pages.
(Continued)

*Primary Examiner* — Mohammad Ali
(74) *Attorney, Agent, or Firm* — McNees Wallace & Nurick LLC

(57) ABSTRACT

A drive system for a compressor of a chiller system includes a variable speed drive. The variable speed drive receives an input AC power at a fixed input AC voltage and a fixed input frequency, and provides an output AC power at a variable voltage and variable frequency. The variable speed drive includes a converter connected to an AC power source. The converter is arranged to convert the input AC voltage to a DC voltage. A DC link is connected to the converter and configured to filter and store the DC voltage from the converter. An inverter is connected to the DC link. A motor is connectable to the compressor for powering the compressor. A controller is arranged to control switching in the converter and the inverter. The controller is arranged to apply randomized pulse width modulation to vary the switching frequency of transistors in the converter and the inverter at each switching cycle. The motor may be a permanent magnet synchronous motor.

17 Claims, 5 Drawing Sheets

U.S. PATENT DOCUMENTS

| | | | |
|---|---|---|---|
| 3,621,366 A | 11/1971 | Duff et al. | |
| 4,308,491 A | 12/1981 | Joyner, Jr. et al. | |
| 4,587,474 A | 5/1986 | Espelage et al. | |
| 4,697,131 A | 9/1987 | Schauder et al. | |
| 4,758,771 A | 7/1988 | Saito et al. | |
| 4,761,726 A | 8/1988 | Brown | |
| 4,864,483 A | 9/1989 | Divan | |
| 4,959,602 A | 9/1990 | Scott et al. | |
| 5,038,267 A | 8/1991 | De Doncker et al. | |
| 5,081,368 A | 1/1992 | West | |
| 5,123,080 A | 6/1992 | Gillett et al. | |
| 5,127,085 A | 6/1992 | Becker et al. | |
| 5,298,848 A | 3/1994 | Ueda et al. | |
| 5,410,230 A | 4/1995 | Bessler et al. | |
| 5,483,142 A | 1/1996 | Skibinski et al. | |
| 5,499,178 A | 3/1996 | Mohan et al. | |
| 5,570,279 A | 10/1996 | Venkataramanan | |
| 5,592,058 A | 1/1997 | Archer et al. | |
| 5,625,549 A | 4/1997 | Horvat | |
| 5,646,458 A | 7/1997 | Bowyer et al. | |
| 5,747,955 A | 5/1998 | Rotunda et al. | |
| 5,757,599 A | 5/1998 | Crane | |
| 5,796,234 A | 8/1998 | Vrionis | |
| 5,852,551 A * | 12/1998 | Lee | 363/39 |
| 5,869,946 A | 2/1999 | Carobolante | |
| 5,889,667 A | 3/1999 | Bernet | |
| 5,909,367 A | 6/1999 | Change | |
| 5,936,855 A | 8/1999 | Salmon | |
| 5,969,957 A * | 10/1999 | Divan et al. | 363/36 |
| 5,969,966 A | 10/1999 | Sawa et al. | |
| 6,005,362 A | 12/1999 | Enjeti et al. | |
| 6,050,083 A | 4/2000 | Meckler | |
| 6,072,302 A | 6/2000 | Underwood et al. | |
| 6,118,676 A | 9/2000 | Divan et al. | |
| 6,160,722 A | 12/2000 | Thommes et al. | |
| 6,163,472 A | 12/2000 | Colby | |
| 6,239,513 B1 | 5/2001 | Dean et al. | |
| 6,246,209 B1 * | 6/2001 | Kim | 318/811 |
| 6,276,148 B1 | 8/2001 | Shaw | |
| 6,313,600 B1 | 11/2001 | Hammond et al. | |
| 6,348,775 B1 | 2/2002 | Edelson et al. | |
| 6,407,937 B2 | 6/2002 | Bruckmann et al. | |
| 6,437,535 B1 * | 8/2002 | Sinha | 318/800 |
| 6,487,096 B1 | 11/2002 | Gilbreth et al. | |
| 6,507,503 B2 | 1/2003 | Norrga | |
| 6,559,562 B1 | 5/2003 | Rostron | |
| 6,566,764 B2 | 5/2003 | Rebsdorf et al. | |
| 6,603,675 B1 | 8/2003 | Norrga | |
| 6,625,046 B2 | 9/2003 | Geissler | |
| 6,657,874 B2 | 12/2003 | Yu | |
| 6,658,870 B1 | 12/2003 | Jenkins | |
| 6,686,718 B2 | 2/2004 | Jadric et al. | |
| 6,704,182 B2 | 3/2004 | Bruckmann et al. | |
| 6,768,284 B2 | 7/2004 | Lee et al. | |
| 6,801,019 B2 | 10/2004 | Haydock et al. | |
| 7,005,829 B2 | 2/2006 | Schnetzka | |
| 7,081,734 B1 | 7/2006 | Jadric et al. | |
| 7,116,066 B2 | 10/2006 | Lin | |
| 7,135,828 B2 | 11/2006 | Lin | |
| 7,408,312 B2 | 8/2008 | Itou et al. | |
| 7,411,329 B2 | 8/2008 | Murakami et al. | |
| 7,555,912 B2 | 7/2009 | Schnetzka et al. | |
| 7,948,136 B2 * | 5/2011 | Miyata | 310/156.45 |
| 2001/0001227 A1 * | 5/2001 | Notohara et al. | 318/268 |
| 2001/0028236 A1 * | 10/2001 | Cheong | 318/701 |
| 2002/0176261 A1 | 11/2002 | Norrga | |
| 2003/0015873 A1 | 1/2003 | Khalizadeh et al. | |
| 2003/0052544 A1 | 3/2003 | Yamamoto et al. | |
| 2003/0133317 A1 | 7/2003 | Norrga | |
| 2003/0168919 A1 | 9/2003 | Friedrichs et al. | |
| 2003/0218887 A1 * | 11/2003 | Kojori et al. | 363/16 |
| 2003/0231518 A1 | 12/2003 | Peng | |
| 2004/0008005 A1 | 1/2004 | Sakai et al. | |
| 2004/0012986 A1 | 1/2004 | Riggio et al. | |
| 2004/0113572 A1 * | 6/2004 | Iwaji et al. | 318/254 |
| 2005/0035671 A1 * | 2/2005 | Evans et al. | 310/156.35 |
| 2005/0057210 A1 | 3/2005 | Ueda et al. | |
| 2005/0068001 A1 | 3/2005 | Skaug et al. | |
| 2005/0099743 A1 * | 5/2005 | Lee | 361/42 |
| 2005/0190511 A1 | 9/2005 | Crane et al. | |
| 2006/0208685 A1 | 9/2006 | Schnetzka | |
| 2007/0032909 A1 * | 2/2007 | Tolbert et al. | 700/276 |
| 2007/0063668 A1 | 3/2007 | Schnetzke et al. | |

FOREIGN PATENT DOCUMENTS

| | | |
|---|---|---|
| EP | 0283954 A2 | 9/1988 |
| EP | 0422221 A1 | 11/1989 |
| EP | 1300937 A2 | 4/2003 |
| EP | 031336 A2 | 8/2008 |
| JP | 6105563 | 9/1992 |
| JP | 5068376 | 3/1993 |
| JP | 2002176767 | 6/2002 |
| JP | 4026374 | 9/2006 |
| WO | 9314559 A1 | 7/1993 |
| WO | 9732168 A1 | 9/1997 |
| WO | 2004098038 A1 | 11/2004 |

OTHER PUBLICATIONS

IGBT with Reverse Blocking Capability, IXYS Semiconductor GmbH, 2003, pp. 1-2.

Ahmed Elasser and T. Paul Chow, Silicon Carbide Benefits and Advantages for Power Electronics Circuits and Systems, Proceedings of the IEEE, vol. 90, No. 6, Jun. 2002, pp. 969-986.

M. Takei, T. Naito and K. Ueno, The Reverse Blocking IGBT for Matrix Converter with Ultra-Thin Wafer Technology, 4 pages.

Klumpner C. et al; "Using Reverse Blocking IGBTs in Power Converters for Adjustable Speed Drives", Conference Record of the 2003 IEEE Industry applications Conference 38th IAS Annual Meeting, Salt Lake City, UT, Oct. 12-16, 2003, vol. 3 of 3 Conf. 38, pp. 1516-1523 USA.

Ozipineci B. et al.: "4H-SiC GTO Thyristor and p-n Diode Loss Models for HVDC Converter", Industry Applications Conference 2004, 39th IAS Annual Meeting, conference record of the 2004 IEEE Seattle, WA USA, Oct. 2004, vol. 2, pp. 1238-1243.

Jue Wang et al.: "Evaluation of High-Voltage 4H-SiC Switching Devices" IEEE Transactions on Electron Devices, IEEE Service Center, Piscataway, NJ, vol. 46, No. 3, Mar. 1999.

Annabelle Van Zyl, Rene Spee, Alex Faveluke, and Shibashis Bhowmik; Voltage Sag Ride-Through for Adjustable-Speed Drives With Active Rectifiers; Nov./Dec. 1998; vol. 34, Issue No. 6; IEEE Transactions on Industry Applications.

Annette Von Jouanne, Prasad N. Enjeti, and Basudeb Banerjee; Assessment of Ride-Through Alternatives for Adjustable-Speed Drives; Jul./Aug. 1999; vol. 35, Issue No. 4; IEEE Transactions on Industry Applications.

Morimoto et al., "Expansion of Operating Limits for Permanent Magnet Motor by Current Vector Control Considering Inverter Capacity", IEEE Transactions on Industry Applications, vol. 26, Issue No. 5, Sep./Oct. 1990.

Libor Prokop and Pavel Grasblum, "3-Phase PM Synchronous Motor Vector Control Using a 56F80x, 56F8100, or 56F8300 Device", Freescale Semiconductor: Application Note, AN1931, Rev. 3 Jan. 2005.

\* cited by examiner

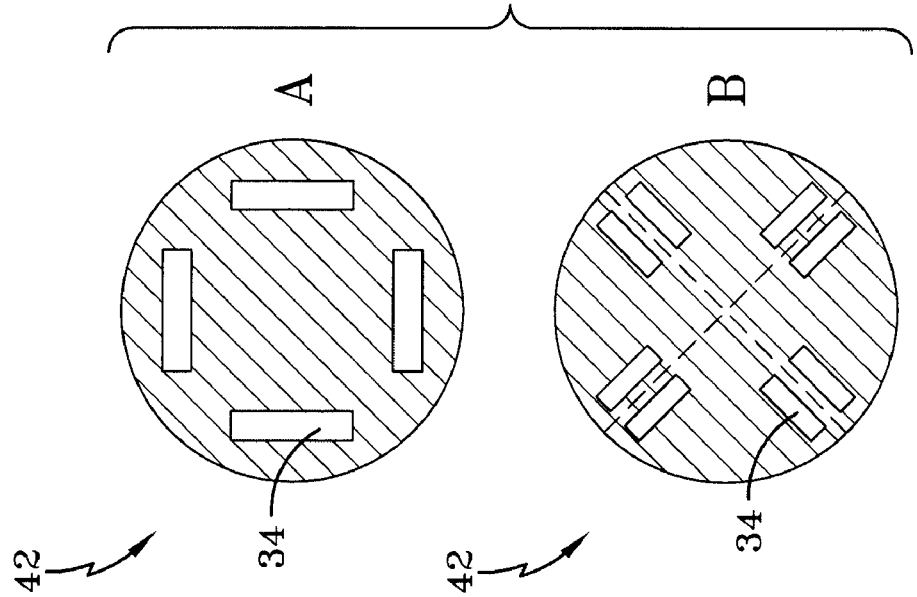
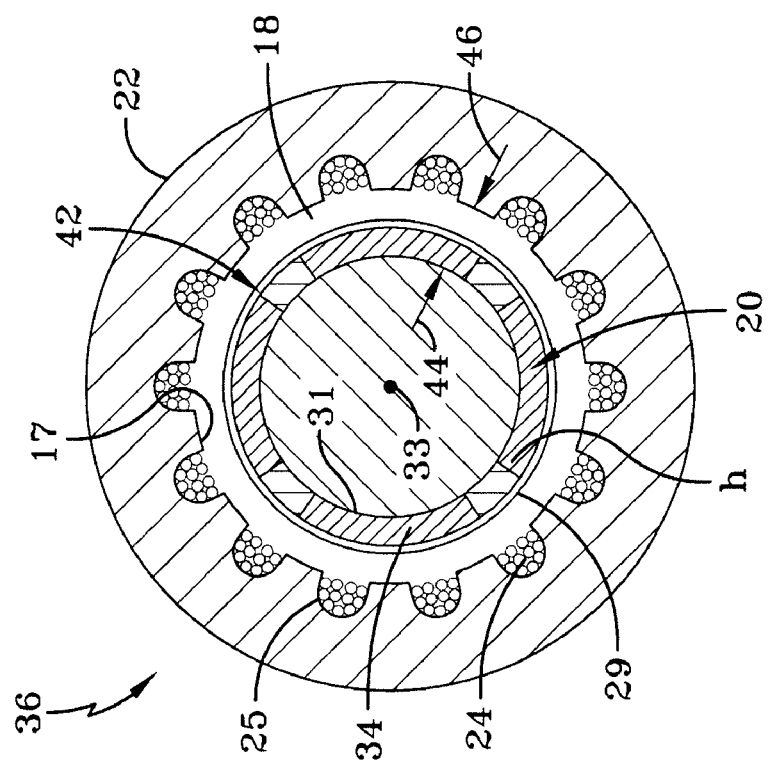

VARIABLE SPEED DRIVE WITH PULSE-WIDTH MODULATED SPEED CONTROL

CROSS-REFERENCE TO RELATED APPLICATIONS

This patent application claims the benefit of U.S. Provisional Patent Application No. 61/102,687, filed Oct. 3, 2008, entitled PERMANENT MAGNET MOTOR DRIVE AND CONTROLLER, for which priority is claimed and the disclosure of which is hereby incorporated by reference.

BACKGROUND

The application generally relates to a permanent magnet motor drive. The application relates more specifically to a variable speed drive (VSD) for controlling a permanent magnet motor, using randomized Pulse-Width Modulation (PWM) techniques, that powers a compressor in heating, ventilation, air conditioning and refrigeration (HVAC&R) systems.

Currently VSDs are used to power a variety of motor types in HVAC&R systems. Common types of motors that are used for HVAC&R applications include induction motors, switched reluctance motors, and other synchronous and DC motors capable of handling the torque and speed ranges in such HVAC&R systems.

Permanent magnet synchronous motors (PMSM) are of particular interest for use as traction motors in electric vehicle designs due to their higher efficiency and higher power density as compared to regular DC motors and AC induction motors. PMSM motors typically operate with a permanent magnet rotor. A permanent magnet rotor may be configured with surface mounted permanent magnets or with interior permanent magnets having different arrangements. The PMSM is a rotating electric machine in which the stator might be similar to a stator of an induction motor and the rotor has surface-mounted or interior permanent magnets. However, a totally different stator design for a PMSM is possible and a stator design optimization is necessary even though the stator topology might be similar to an induction machine. The use of a permanent magnet to generate a substantial air gap magnetic flux makes it possible to design highly efficient PMSMs.

A PMSM that is driven by a sinusoidal current is referred to as a PMSM while, a PMSM that is driven by a rectangular 120° electrical phase-current waveform is can be referred to as a brushless dc (BLDC) machine. The rotor structure of the PMSM and BLDC might be the same such as surface-mounted permanent magnet rotor. Both the PMSM and BLDC are driven by currents coupled with the given rotor position. The angle between the generated stator flux linkage and the rotor flux linkage, which is generated by a rotor magnet, defines the torque, and thus speed, of the motor. Both the magnitude of the stator flux linkage and the angle between the stator flux linkage and rotor flux linkage are controllable to maximize the torque or minimize the losses. To maximize the performance of PMSM and ensure the system stability, the motor requires a power electronics converter for proper operation.

For a three-phase PMSM, a standard three-phase power output stage is used, which is the same power stage that is used for AC induction motors. The power stage utilizes six power transistors with independent switching. The power transistors are switched in the complementary mode. The fundamental sine wave output is generated using a PWM technique.

Heretofore PMSM motors and their associated VSDs have been limited in their application in commercial and industrial scale HVAC&R systems, largely due to factors relating to relatively low performance requirements from old HVAC&R systems, higher system cost, and complicated control system design.

SUMMARY

The present invention relates to a drive system for a compressor of a chiller system includes a variable speed drive. The variable speed drive receives a fixed input AC voltage and a fixed input frequency, and provides an output AC power at a variable voltage and variable frequency. The variable speed drive includes a converter connected to an AC power source. The converter is arranged to convert the input AC voltage to a DC voltage. A DC link is connected to the converter and configured to filter and store the DC voltage from the converter. An inverter is connected to the DC link. A motor is connectable to the compressor for powering the compressor. A controller is arranged to control switching in the converter and the inverter. The controller is arranged to apply randomized pulse width modulation to vary the switching frequency of transistors in the converter and the inverter at each switching cycle. The motor may be a permanent magnet synchronous motor.

The present invention also relates to a chiller system includes a compressor, a condenser, and an evaporator connected in a closed refrigerant loop. A motor is connected to the compressor to power the compressor. A variable speed drive is connected to the motor. The variable speed drive is arranged to receive an input AC power at a fixed input AC voltage and a fixed input frequency and provide an output power at a variable voltage and variable frequency to the motor. The variable voltage having a maximum voltage greater in magnitude than the fixed input AC voltage and the variable frequency having a maximum frequency greater than the fixed input frequency, the variable speed drive includes a converter connected to an AC power source providing the input AC voltage. The converter is arranged to convert the input AC voltage to a DC voltage. A DC link is connected to the converter. The DC link is arranged to filter and store the DC voltage from the converter. An inverter is connected to the DC link. A controller is arranged to control switching in the converter and the inverter. The controller is arranged to apply randomized pulse width modulation to vary the switching frequency of transistors in the converter and the inverter at each switching cycle. The motor may be a permanent magnet synchronous motor.

The present invention further relates to a method of controlling a variable speed drive is disclosed. The variable speed drive includes a converter, a DC link, and an inverter. The method includes providing an inverter connected to a DC link, the inverter configured to power a corresponding load; and generating a randomized switching signal for the inverter, the randomized switching signal being operable to activate and deactivate the inverter to obtain a preselected output power and a preselected output frequency from the inverter.

BRIEF DESCRIPTION OF THE FIGURES

FIG. 4 is an exemplary schematic diagram of a permanent magnet synchronous motor.

FIG. 5 is an exemplary schematic diagram of the rotor of an internal PMSM (IPM).

DETAILED DESCRIPTION OF THE EXEMPLARY EMBODIMENTS

Figure 1:
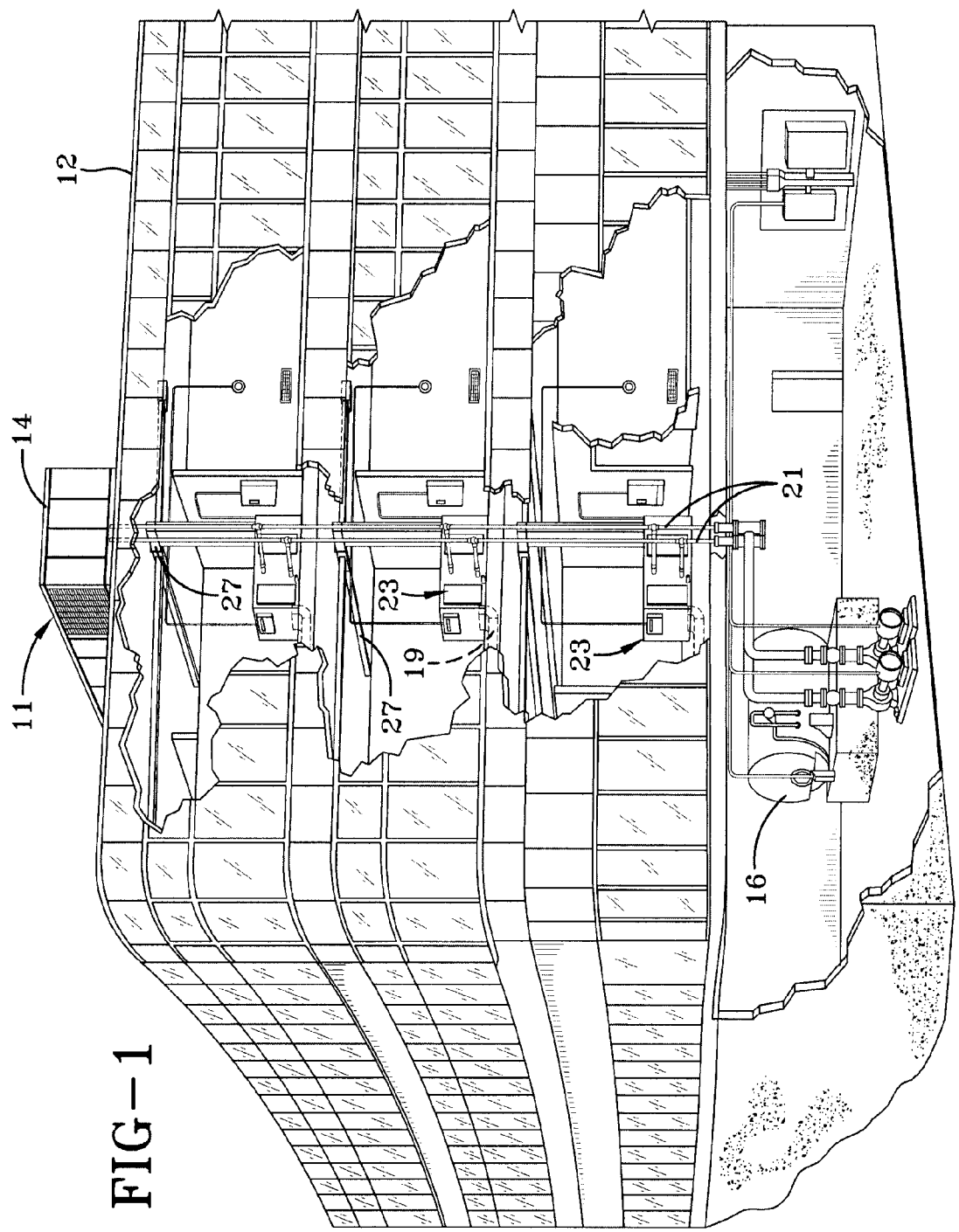
FIG. 1 shows an exemplary embodiment of a Heating, Ventilation, Air Conditioning and Refrigeration (HVAC&R) system in a commercial environment.

FIG. 1 shows an exemplary environment for a Heating, Ventilating, Air Conditioning system (HVAC system) 11 in a building 12 for a commercial setting. HVAC system 11 may include a compressor incorporated into a vapor compression system 10 that can supply a chilled liquid that may be used to cool building 12. HVAC system 11 can also include a boiler 17 used to heat building 12, and an air distribution system that circulates air through building 12. The air distribution system can include an air return duct 19, an air supply duct 27 and an air handler 23. Air handler 23 can include a heat exchanger that is connected to boiler 17 and vapor compression system 10 by conduits 21. The heat exchanger in air handler 23 may receive either heated liquid from boiler 17 or chilled liquid from vapor compression system 10, depending on the mode of operation of HVAC system 11. HVAC system 11 is shown with a separate air handler on each floor of building 12, but it will be appreciated that these components may be shared between or among floors.

Figure 2:
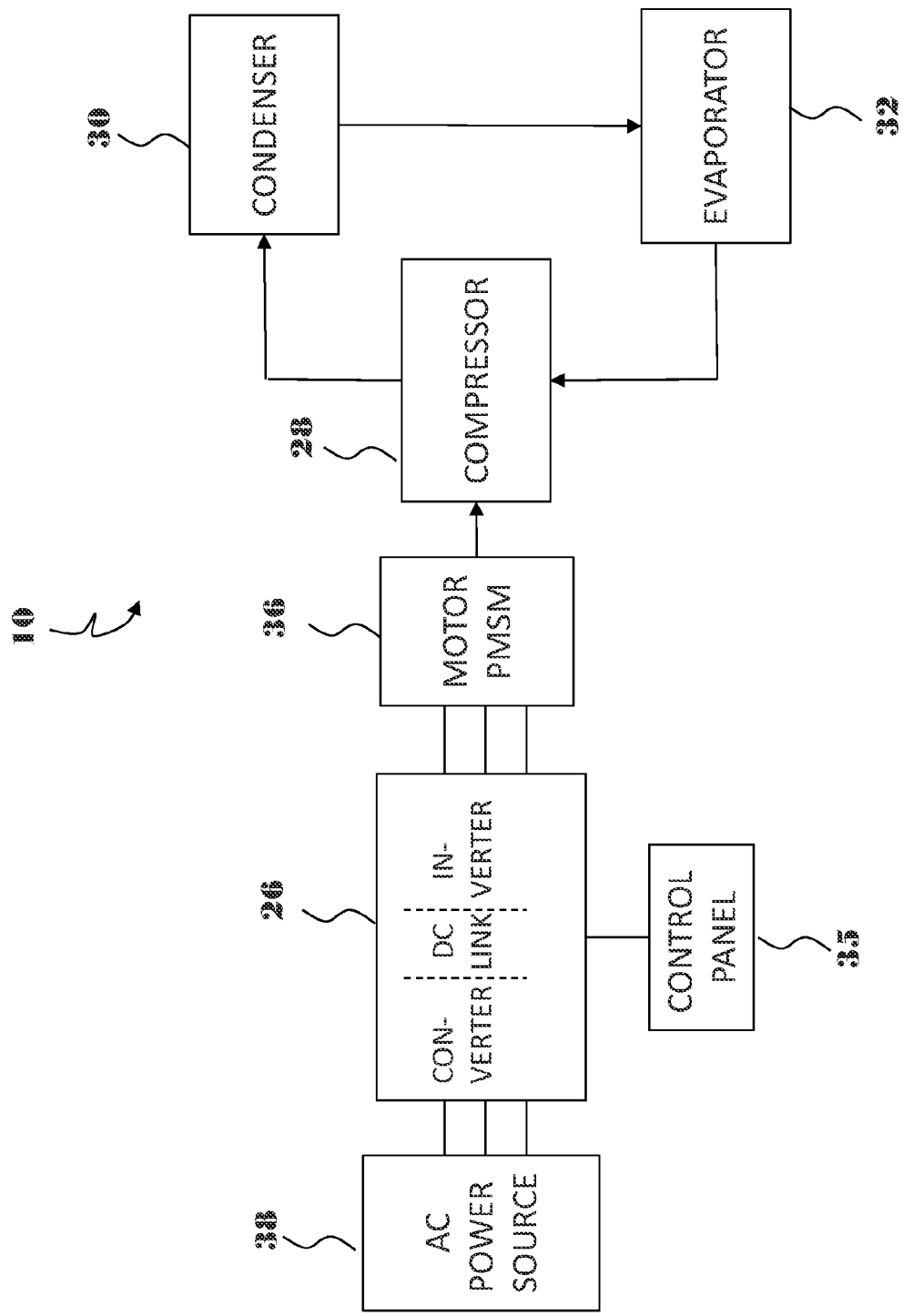
FIG. 2 schematically illustrates an exemplary embodiment of vapor compression system that may be used in the exemplary embodiment of FIG. 1.

FIG. 2 illustrates generally an exemplary configuration for powering HVAC&R system with a variable speed drive (VSD) 26 that may be used in building 12 in FIG. 1. An AC power source 38 supplies AC power to VSD 26, which in turn, supplies AC power to a motor, for example, PMSM 36. In another embodiment, VSD 26 can power more than one motor. PMSM 36 is used to drive a corresponding compressor 28 of a refrigeration or chiller system. Chiller system 100 includes a compressor 28, a condenser 30, a water chiller or evaporator 32, and a control panel 35. The compressor 28, condenser 30 and evaporator 32 are connected in a closed refrigerant loop. AC power source 38 provides single phase or multi-phase (e.g., three phase), fixed voltage, and fixed frequency AC power to VSD from an AC power grid or distribution system that is present at a site. AC power source 38 can supply a three phase AC voltage or nominal line voltage of 200 V, 230 V, 380 V, 460 V, or 600 V, at a nominal line frequency of 50 Hz or 60 Hz to VSD 26 depending on the corresponding AC power grid. It is to be understood that AC power source 38 can provide any suitable fixed nominal line voltage or fixed nominal line frequency to VSD 26 depending on the configuration of the AC power grid. In addition, a particular site can have multiple AC power grids that can satisfy different line voltage and line frequency requirements. For example, a site may have a 230 VAC power grid to handle certain applications and a 460 VAC power grid to handle other applications.

VSD 26 receives AC power having a particular fixed line voltage and fixed line frequency from AC power source and provides AC power to PMSM 36 at a desired voltage and desired frequency, both of which can be varied to satisfy particular requirements. VSD 26 may include the ability to provide AC power to the PMSM 36 having higher voltages and frequencies or lower voltages and frequencies than the fixed voltage and fixed frequency received from AC power source 38. PMSM 36 may have a predetermined rated voltage and frequency that is greater than the fixed AC input voltage and frequency, however the rated motor voltage and frequency may also be equal to or lower than the fixed AC input voltage and frequency.

HVAC system 11 may include compressor 28, a condenser 30, a liquid chiller or evaporator 32 and a control panel 35. Compressor 28 is driven by motor 36 that is powered by VSD 26. VSD 26 may be, for example, a vector-type drive or a variable-voltage, variable frequency (VVVF) drive. VSD 26 receives AC power having a particular fixed line voltage and fixed line frequency from AC power source 38 and provides AC power to motor 36 at desired voltages and desired frequencies, both of which can be varied to satisfy particular requirements. Control panel 35 can include a variety of different components, such as an analog to digital (A/D) converter, a microprocessor, a non-volatile memory, and an interface board, to control operation of system 10. Control panel 35 can also be used to control the operation of VSD 26, and motor 36.

Compressor 28 compresses a refrigerant vapor and delivers the vapor to condenser 30 through a discharge line. Compressor 28 can be any suitable type of compressor, for example, a screw compressor, a centrifugal compressor, a reciprocating compressor, a scroll compressor, etc. The refrigerant vapor delivered by compressor 28 to condenser 30 enters into a heat exchange relationship with a fluid, for example, air or water, and undergoes a phase change to a refrigerant liquid as a result of the heat exchange relationship with the fluid. The condensed liquid refrigerant from condenser 30 flows through an expansion device (not shown) to evaporator 32.

Evaporator 32 may include connections for a supply line and a return line of a cooling load. A secondary liquid, for example, water, ethylene, calcium chloride brine or sodium chloride brine, travels into evaporator 32 via return line and exits evaporator 32 via supply line. The liquid refrigerant in evaporator 32 enters into a heat exchange relationship with the secondary liquid to lower the temperature of the secondary liquid. The refrigerant liquid in evaporator 32 undergoes a phase change to a refrigerant vapor as a result of the heat exchange relationship with the secondary liquid. The vapor refrigerant in evaporator 32 exits evaporator 32 and returns to compressor 28 by a suction line to complete the cycle.

Figure 3:
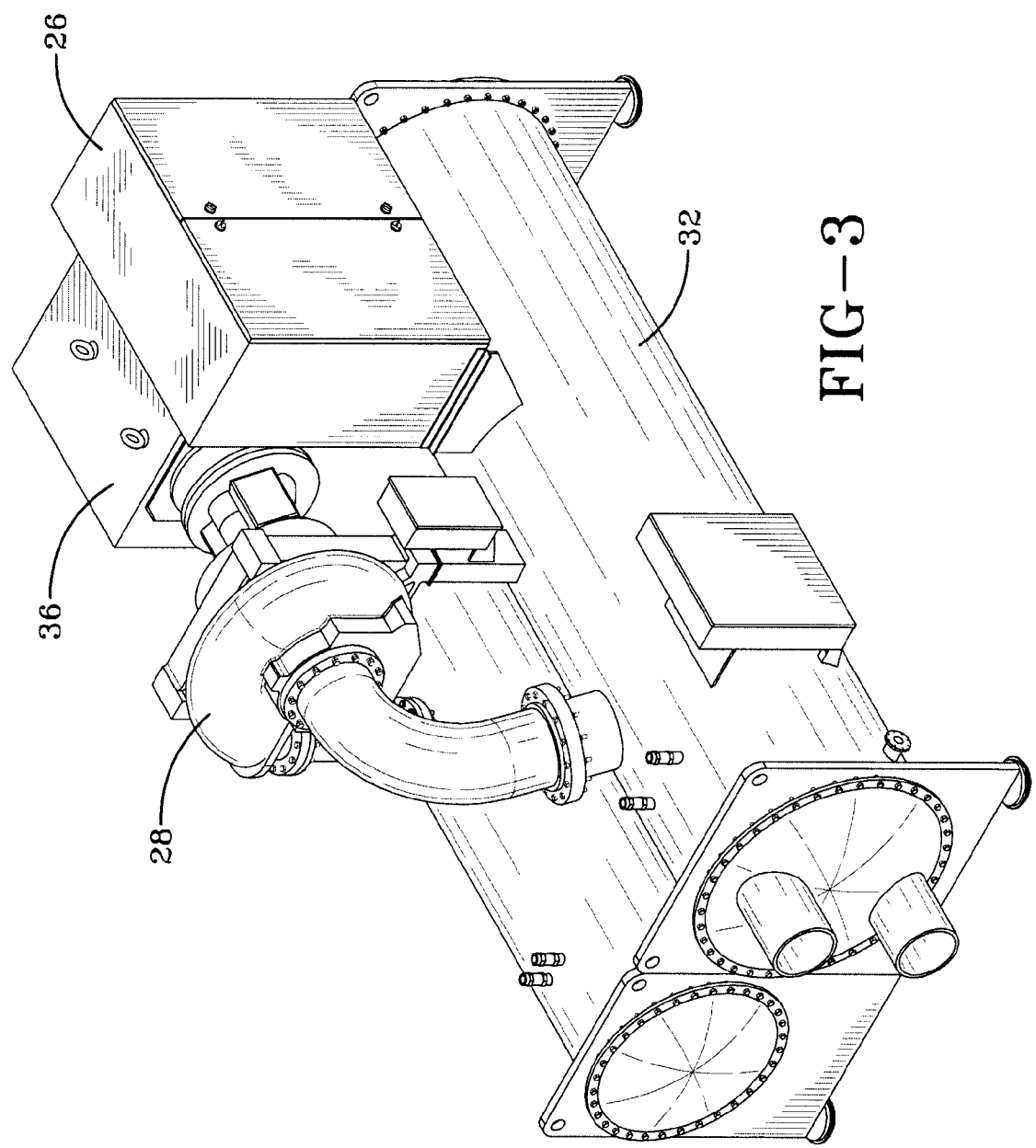
FIG. 3 shows an exemplary embodiment of a variable speed drive (VSD) mounted on a vapor compression system.

FIG. 3 shows an exemplary vapor compression system of an HVAC&R system. The VSD 26 is mounted on top of the evaporator 32, and adjacent to motor 36, and control panel 35. Motor 36 may be mounted on condenser 30 on the opposite side of evaporator 32. Output wiring (not shown) from VSD 26 is connected to motor leads (not shown) for motor 36, to power motor 36, which drives compressor 28.

Referring to FIG. 4, an exemplary PMSM 36 includes a stator portion 22. The stator portion 22 is configured substantially similar to a stator of a conventional induction motor. Stator portion 22 includes a plurality of windings 21 disposed in slots 25 defined by a plurality of adjacent teeth 17, symmetrically distributed about an inside radius of stator portion 22 adjacent to a rotor portion 20. Rotor portion 20 is disposed axially concentrically with and inside stator portion 22, rotor portion 20 and stator portion 22 separated by an air gap 18. Rotor portion 20 may include a cylindrical steel rotor frame or cage 31 with a plurality of permanent magnets 34 arranged peripherally on rotor cage 31. Permanent magnets 34 produce a magnetic field in air gap 18 as rotor portion 20 rotates. Permanent magnets 34 may be arranged to provide multiple pole arrangements, for example 2-pole or 4-pole, in rotor portion 20. Permanent magnets 34 may be adhesively affixed to cage 32, and are enveloped by a sleeve potion 29 to maintain permanent magnets 34 on cage 31 when centrifugal forces act on rotor portion 20 during rotation of PMSM 36. Sleeve potion 29 may be constructed of carbon fiber tubular sheet material, stainless steel or other similarly flexible, high strength, magnetically non-permeable material. Air gap 18 is small relative to an effective air gap g shown between opposing arrows 44, 46. It is desirable that air gap 18 be as narrow as possible. Effective air gap g includes the height h of permanent magnets 34 and sleeve potion 29.

In another embodiment, PMSM 36 may be configured as an internal permanent magnet motor (IPM). FIG. 5 illustrates schematically an exemplary IPM rotor 42. The IPM 42 includes permanent magnets 34 implanted within rotor portion 20, rather than being mounted on the surface of rotor portion 20.

In another exemplary embodiment, VSD 26 may be configured for interleaving an Pulse Width Modulation (PWM) method associated with multiple compressors. Interleaving of PWM pulses is accomplished by sensing a phase relationship between outputs of two or more compressors, and distributing or staggering pulsations so that the respective pulses are out of phase with one another. Interleaving pulses may be done using feedback control loops to insert delay in one or more of the multiple inverters, such that all inverters in a multiple inverter system are pulsating at differing times. Interleaving decreases the high frequency current in the dc link of VSD 26, therefore allowing for a more compact dc link capacitor design.

In another exemplary embodiment, VSD 26 may have randomized Pulse width modulation (PWM). The randomization of the pulse width modulator can significantly reduce the size of the input/output filters and thus significantly reduce the cost of any associated passive components. In randomized PWM the switching frequency of the transistors or switches of the inverter and/or converter at each switching cycle is varied in contrast to a traditional method where this frequency is fixed. Randomization of the pulse width modulator reduces the magnitude of the harmonic components in the line currents and voltages, and thus requires smaller inductors as compared to the traditional, non-randomized PWM method.

Randomized pulse width modulation may also reduce the level of the electromagnetic interference and the level of acoustic noise generated by the drive system with respect to a VSD that applies traditional pulse width modulation. The acoustic noise is primarily produced by harmonic currents passing through magnetic components of VSD 26, for example, line inductors. A mitigating effect on the acoustic noise is achieved by reducing the magnitude of high frequency current harmonics generated by VSD 26 as shown in FIGS. 6 and 7.

Figure 6:
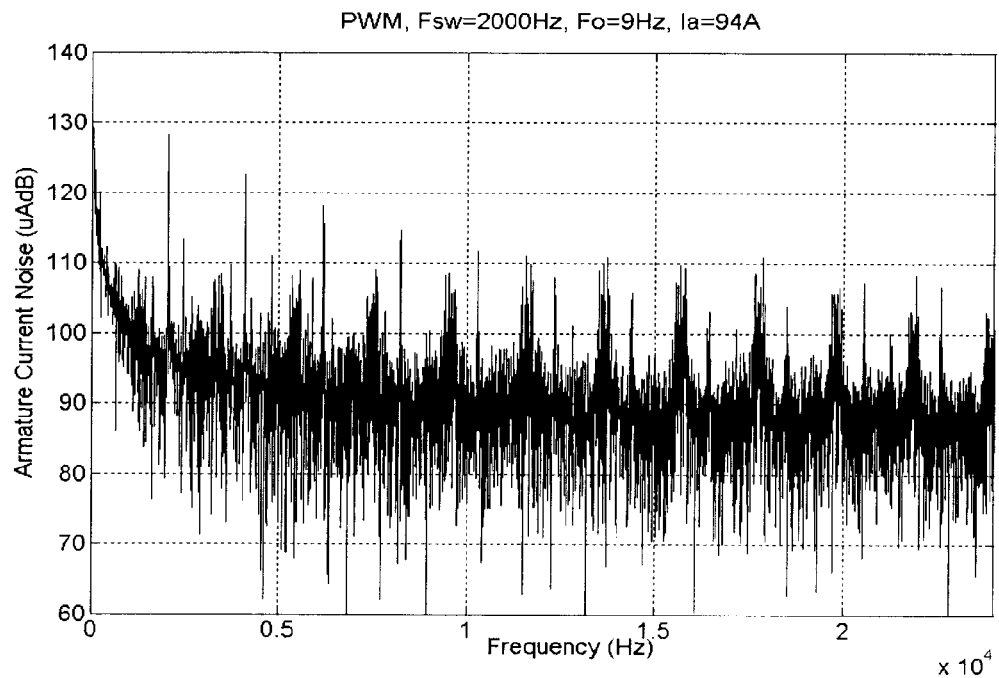
FIG. 6 is a graphic illustration of armature current noise versus frequency for a traditional PWM control system.

FIG. 6 is a graphic illustration of armature current noise in μAdB versus frequency (Hz) in the zero to 2.5 KHz range, for a traditional PWM. Noise peaks are prominent at various harmonic frequencies. In the example of FIG. 6, a traditional PWM technique was applied at a nominal switching frequency ($F_{sw}$) of 2000 Hz, a measured armature current equal to 94 amperes, and $F_o$ (output frequency of the fundamental component of the voltage) equal to 9 Hz.

Figure 7:
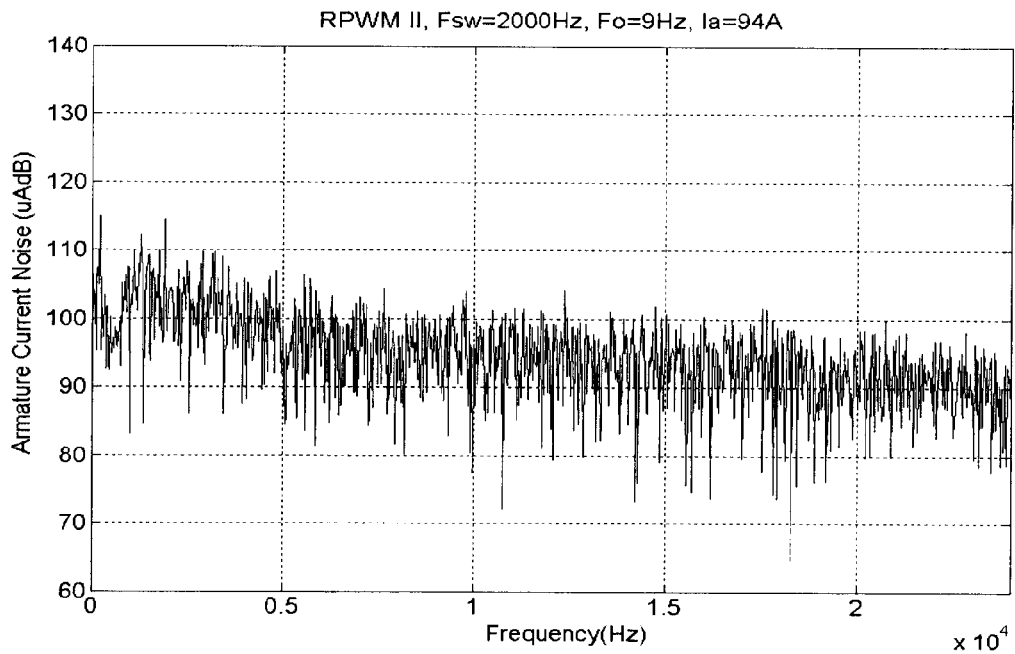
FIG. 7 is a graphic illustration of armature current noise versus frequency for a randomized PWM control system.

FIG. 7 is a graphic illustration of armature current noise in μAdB versus frequency (Hz) in the zero to 2.5 KHz range, for a randomized PWM controlled motor. Note that the noise peaks have been substantially eliminated relative to the traditional PWM technique that was employed in the example of FIG. 6 described above. Other parameters remained the same, $F_{sw}$ equal to 2000 Hz, armature current equal to 94 amperes, and $F_o$ equal to 9 Hz.

Randomized PWM may help to reduce the magnitude of the electromagnetic noise through reduction of the harmonic currents in high frequency range. High frequency harmonic current may interfere with other parts of the electric circuits through parasitic capacitances and inductances present in electrical circuits of electric drive system. High frequency harmonic current therefore may cause VSD 26 to fail, or cause damage to electrical components throughout the system 14.

Randomized PWM may be used in various types of VSDs, e.g., variable frequency drives or vector drives, where a closed loop control is required to achieve faster transient torque or speed response. Randomization of the PWM requires the randomization of the sampling frequency as well. Sampling frequency is the frequency of the sampled feedback current and voltage values necessary for the closed loop control operation. Randomized sampling frequency is necessary because the PWM on the output of the drive, and sampling frequency are dependent on each other. Thus, VSD 26 with randomized PWM requires operation of the closed loop control controller with randomly sampling current and voltage data.

While only certain features and embodiments of the invention have been illustrated and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A drive system for a compressor of a chiller system, the drive system comprising:
    a variable speed drive, the variable speed drive being configured to receive an input AC voltage at a fixed AC input voltage and provide an output AC power at a variable voltage and variable frequency, the variable speed drive comprising:
        a converter stage connected to an AC power source providing the input AC voltage, the converter stage being configured to convert the input AC voltage to a DC voltage;
        a DC link connected to the converter stage, the DC link being configured to filter and store the DC voltage from the converter stage; and
        at least one inverter stage connected to the DC link;
    a motor connectable to the compressor for powering the compressor; and
    a controller configured to control switching in the converter stage and the inverter stage, the controller configured to apply randomized pulse width modulation to vary the switching frequency of transistors in the converter stage and the inverter stage at each switching cycle.

2. The drive system of claim 1, wherein the motor is a permanent magnet synchronous motor.

3. The drive system of claim 1, wherein the controller is further configured to apply randomized pulse width modulation to reduce a magnitude of harmonic components present in a line current and a line voltage of the motor.

4. The drive system of claim 1, wherein the controller is further configured to apply randomized pulse width modulation to reduce the level of the electromagnetic interference and the level of acoustic noise generated by the drive system.

5. The drive system of claim 1, wherein the controller is further configured to apply randomized pulse width modulation to reduce the magnitude of the electromagnetic noise through reduction of the harmonic currents in high frequency range.

6. The drive system of claim 2, wherein the permanent magnet synchronous motor further comprises a plurality of permanent magnets arranged in multiple pole arrangements in a rotor portion.

7. The drive system of claim 6, wherein the plurality of permanent magnets being adhesively affixed to a rotor cage, the plurality of permanent magnets enveloped by a sleeve portion to maintain the plurality of permanent magnets on the rotor cage when centrifugal forces act on rotor portion during rotation.

8. The drive system of claim 7, wherein the rotor cage is a cylindrical steel rotor cage.

9. The drive system of claim 7, wherein the sleeve portion comprises a flexible, high strength, magnetically non-permeable material.

10. The drive system of claim 9, wherein the material is carbon fiber tubular sheet material or stainless steel.

11. The drive system of claim 1, wherein the controller is further configured to apply a randomized sampling of sampling feedback current and voltage values for a closed loop control operation for randomized pulse width modulation.

12. A chiller system comprising:
a compressor, a condenser, and an evaporator connected in a closed refrigerant loop;
a motor connected to the compressor to power the compressor; and
a variable speed drive connected to the motor, the variable speed drive being configured to receive an input AC power at a fixed input AC voltage and a fixed input frequency and provide an output power at a variable voltage and variable frequency to the motor, the variable voltage having a maximum voltage greater in magnitude than the fixed input AC voltage and the variable frequency having a maximum frequency greater than the fixed input frequency, the variable speed drive comprising:
a converter stage connected to an AC power source providing the input AC voltage, the converter stage being configured to convert the input AC voltage to a DC voltage;
a DC link connected to the converter stage, the DC link being configured to filter and store the DC voltage from the converter stage; and
at least one inverter stage connected to the DC link; and
a controller configured to control switching in the converter stage and the inverter stage, the controller configured to apply randomized pulse width modulation to vary the switching frequency of transistors in the converter stage and the inverter stage at each switching cycle.

13. The chiller system of claim 12, wherein the motor is a permanent magnet synchronous motor.

14. The chiller system of claim 12, wherein the controller is further configured to apply randomized pulse width modulation to reduce a magnitude of harmonic components present in a line current and a line voltage of the motor.

15. The chiller system of claim 12, wherein the controller is further configured to apply randomized pulse width modulation to reduce the level of the electromagnetic interference and the level of acoustic noise generated by the drive system.

16. The chiller system of claim 12, wherein the controller is further configured to apply randomized pulse width modulation to reduce the magnitude of the electromagnetic noise through reduction of the harmonic currents in high frequency range.

17. A method of controlling a variable speed drive having a converter stage, a DC link stage, and an inverter stage, the method comprising:
providing an inverter stage connected to a DC link stage, the inverter configured to power a corresponding load; and
generating a randomized switching signal for the inverter, the randomized switching signal being operable to vary the switching frequency of a pulse width modulated signal to activate and deactivate the inverter to obtain a preselected output power and a preselected output frequency from the inverter.

* * * * *